United States Patent [19]
Sanderson et al.

[11] Patent Number: 6,008,797
[45] Date of Patent: Dec. 28, 1999

[54] STABLE FOOT PEDAL ASSEMBLY

[75] Inventors: Joel Sanderson, British Columbia; Andrey Gleener, Vancouver, both of Canada

[73] Assignee: ACT Labs, Ltd., Richmond, Canada

[21] Appl. No.: 09/020,760

[22] Filed: Feb. 9, 1998

[51] Int. Cl.⁶ ..................................................... G09G 5/00
[52] U.S. Cl. ........................... 345/156; 345/157; 74/562; 74/563; 74/564; 74/490.14
[58] Field of Search .................................. 345/156, 157; 74/490.14, 563–564, 562

[56] References Cited

U.S. PATENT DOCUMENTS

| | | | |
|---|---|---|---|
| 4,695,819 | 9/1987 | Bowsher | 338/153 |
| 4,958,607 | 9/1990 | Lundberg | 123/399 |
| 5,148,152 | 9/1992 | Stueckle et al. | 345/156 |
| 5,177,473 | 1/1993 | Drysdale | 74/512 |
| 5,237,891 | 8/1993 | Lundberg et al. | 74/560 |
| 5,552,807 | 9/1996 | Hayes et al. | 345/156 |
| 5,812,114 | 9/1998 | Loop | 345/157 |
| 5,838,305 | 11/1998 | Bookstein | 345/163 |
| 5,838,307 | 11/1998 | Bouton | 345/168 |
| 5,841,426 | 11/1998 | Dodson et al. | 345/163 |
| 5,886,685 | 3/1999 | Best | 345/163 |

*Primary Examiner*—Richard A. Hjerpe
*Assistant Examiner*—Henry N. Tran
*Attorney, Agent, or Firm*—Anthony R. Barkume, P.C.

[57] ABSTRACT

A foot pedal assembly having a base, a first support member with an upper end and a lower end, a foot pedal attached to the upper end of the first support member, a second support member with a fore end and an aft end, a guide member with a retention slot affixed to the base, and means for coupling the fore end of the second support member and the lower end of the first support member within the retention slot of the guide member; wherein the means for coupling slidingly guides the fore end of the second support member and the lower end of the first support member substantially along the retention slot upon application of a downward force to the foot pedal.

19 Claims, 5 Drawing Sheets

STABLE FOOT PEDAL ASSEMBLY

BACKGROUND OF THE INVENTION

This invention relates to user interface devices for personal computers and, more particularly, to foot-operated interface control devices for use with personal computers.

A number of different user-interface devices have been developed for video game applications running on a personal computer or dedicated game console apparatus such as joysticks and foot pedals. These devices permit users to control various input signals, which in turn control operation of the game or other program executing on the computer (e.g. a flight simulator). For example, foot pedal interface devices simulate the operation of a car in a car chase game by allowing the user to control the speed with a gas pedal and to control the braking functions with a brake pedal. In conjunction with a steering wheel input device, the user is provided with a simulation experience. The basic interoperability of these types of input devices with personal computers or dedicated game consoles is well known in the art. While various types of such user interfaces such as foot pedals exist, many of the user-interface devices fail to realistically simulate at a reasonable cost the sensation of foot pedals commonly found in vehicles and aircraft.

U.S. Pat. Nos. 5,237,891; 4,695,819; and 4,958,607 disclose foot pedal assemblies designed for application in full-size cars and trucks. The components utilized in these designs are too numerous and/or complex for practical application with personal computers. Likewise, the foot-operated electrical control device disclosed in U.S. Pat. No. 5,177,473 is designed for use in aircraft, also making it impracticable for application involving personal computers and video games due to its complexity and cost.

Therefore, it would be advantageous if a foot-actuated user interface device could realistically simulate foot pedal assemblies that are commonly used in full-size vehicles and aircraft while being both economical to manufacture and affordable to purchase.

U.S. Pat. No. 5,552,807 (incorporated herein by reference) discloses a foot pedal assembly for use with personal computers. The foot pedal in this invention pivots about a rotating gear located approximately midway along the length of the pedal. The user's foot must undergo essentially a rocking motion in order to activate the foot pedal assembly. Such a rocking motion is not an accurate simulation of pedals found in vehicles. Furthermore, since the rocking motion necessitates that the user's heel undergo vertical displacement rather than being substantially fixed (as with standard pedals found in vehicles), a heel rest is required in the design in order to counteract any tendency of the user's heel to shift with respect to the pedal during the rocking motion.

Therefore, it would be advantageous if the foot pedal assembly could accurately simulate the physical sensations associated with an actual pedal typically found in vehicles and aircraft in order to increase the level of realism experienced by the user during participation in the video game. It would also be advantageous if the foregoing could be accomplished without need for additional components such as a heel rest to retain the user's foot on the pedal.

Another foot pedal assembly of the prior art is illustrated in FIGS. 5 and 6 herein, and comprises a foot pedal 13, a base 21, an aft portion 41 of the base 21 and a single elongate vertical support member 15. The vertical support member 15 is attached at one end to the foot pedal 13 and attached at the other end to a gear mechanism that turns a potentiometer as the foot pedal is depressed, thus changing the electrical signal input to the computer (not shown). A generally downward force F2 directed at point P2 is imparted to the vertical support member 15 as the foot pedal 13 is depressed by the user's foot. However, this downward force F2 comprises both a vertical component $F2_V$ and a horizontal component $F2_H$. Thus, as the foot pedal 13 is depressed, the horizontal component $F2_H$ of the downward force F2 causes the center of gravity of the foot pedal assembly to shift forward, resulting in the undesirable raising or tipping of the aft portion 41 of the base 21 vertically upward. The force F2 must be counterbalanced by pressure applied at point P3 to the aft portion 40 in order to prevent the base 21 from tipping, which of course is undesirable.

Furthermore, in depressing the foot pedal 13 of the prior art illustrated in FIGS. 5 and 6, the user's foot must slide backward (towards the user's heel) across the top of the foot pedal 13 if the user is to maintain his heel at center C1 in a stationary position with respect to the base 21. The action of the user's foot sliding backward across the top of the foot pedal 13 causes wear in the contact surfaces of the user's foot and foot pedal 13 as well as a perception of unresponsiveness by the user. The reason that the user's foot must slide across the foot pedal 13 is that an arc A2 which defines the travel of the foot pedal 13 during depression is not concentric with (i.e., does not have the same center as) a natural arc A1 made by the user's foot in depressing the foot pedal 13 while maintaining his heel in a substantially stationary position relative to the base 21. In fact a center C2 of the arc A2 made by the foot pedal 13 is substantially forward of the center C1 of the natural arc A1 made by the user's foot. The horizontal variation of the two centers C1 and C2 causes the average horizontal component $F2_H$ of the arc A2 made by the foot pedal 13 during depression to be much larger than the horizontal component of the natural arc A1 made by the user's foot. Thus, in order to compensate for the greater horizontal component $F2_H$ of the arc A2 made by the foot pedal which is directed forward, the user's foot must slide backward across the top of the foot pedal 13 in the direction shown by arrow AR1.

Therefore, it would be advantageous if depression of the foot pedal assembly would not cause the aft portion of the foot pedal assembly to tilt upwards. It would also be desirable if the foot pedal would naturally follow the arc made by the user's foot during depression thus eliminating the necessity that the user's foot slide across the foot pedal during depression.

SUMMARY OF THE INVENTION

The present invention is a foot pedal assembly having a base, a first support member with an upper end and a lower end, a foot pedal attached to the upper end of the first support member, a second support member with a fore end and an aft end, a guide member with a retention slot affixed to the base, and means for coupling the fore end of the second support member and the lower end of the first support member within the retention slot of the guide member; wherein the means for coupling slidingly guides the fore end of the second support member and the lower end of the first support member substantially along the retention slot upon application of a downward force to the foot pedal.

The foot pedal assembly also has biasing means for opposing the downward force and restoring the members to a quiescent position when the force is removed.

The foot pedal assembly also has gear means, affixed to the aft end of the second support member and rotatably affixed to the base, for translating the sliding of the fore end of the second support member substantially along the retention slot upon application of the downward force into a rotational force. The foot pedal assembly also has signal generation means, such as a potentiometer, for outputting a signal corresponding to the degree of rotation of said gear means.

DETAILED DESCRIPTION OF THE PREFERRED EMBODIMENT

Figure 1:
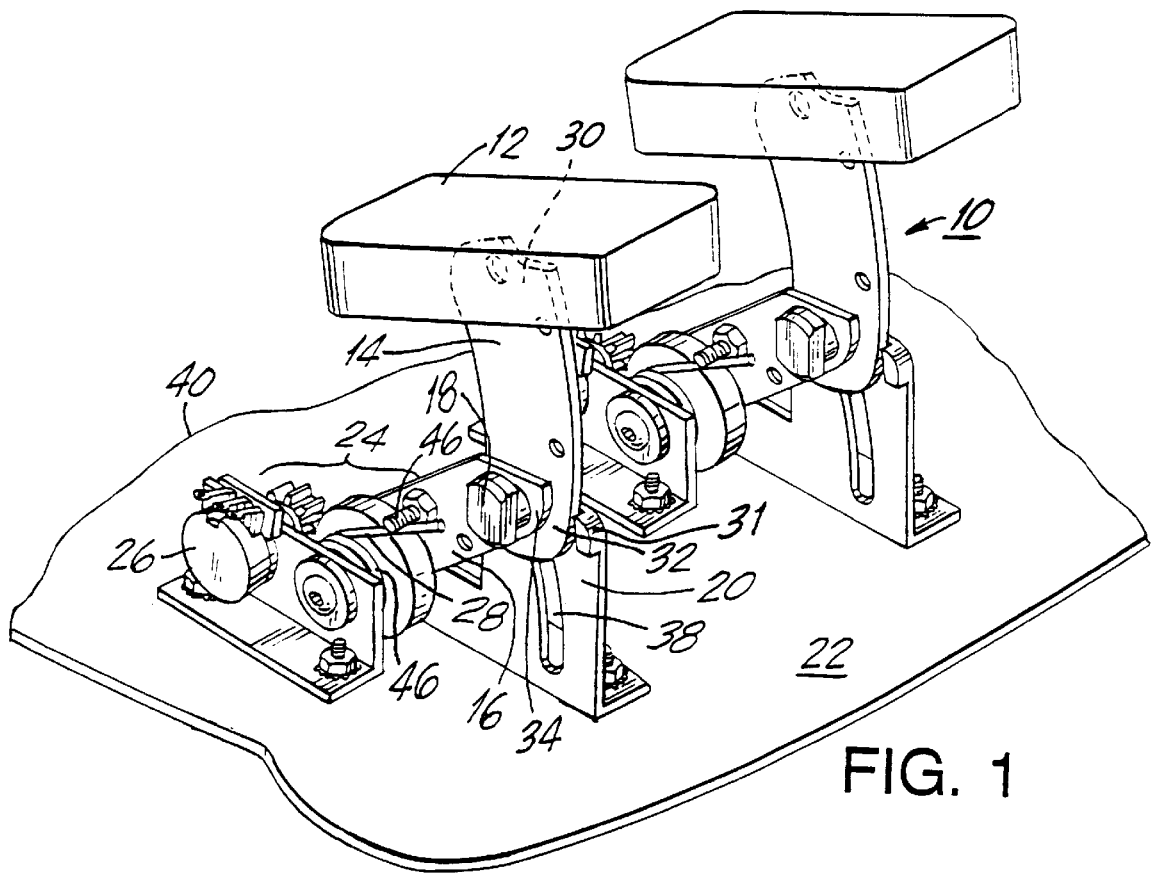
FIG. 1 is a perspective illustration of a stable foot pedal assembly of the present invention.

FIG. 1 illustrates a foot-actuated controller 10 of the present invention which comprises two foot pedal assemblies, each comprising a foot pedal 12, a vertical support member 14, a horizontal support member 16, an axle pin 18, a vertical guide member 20, gear means 24, a potentiometer 26, and biasing means 28. Both foot pedal assemblies are mounted on a base 22 and a suitable housing (not shown) would typically be applied in order to shield a user from moving components and the components from environmental elements. The foregoing discussion, although equally applicable to both foot pedal assemblies, will refer only to one foot pedal assembly in order to avoid redundancy.

The foot pedal 12 is comprised of rubber, plastic or an equivalent material well known in the art which is suitable for providing a gripping surface against the user's foot. A top surface of the foot pedal 12 is positioned at a predetermined angle with respect to the base 22 which is suitable for comfortable placement of the bottom of the user's foot. A bottom side of the foot pedal 12 is rotatably mounted to an upper end 30 of the vertical support member 14 such that the foot pedal 12 is permitted to rotate about the point of attachment a predetermined number of degrees. The vertical support member 14 is elongate and extends substantially downward from the foot pedal 12 such that a longitudinal axis of the vertical support member 14 is substantially vertically disposed. A lower end 32 of the vertical support member 14 is coupled to a fore end 34 of the horizontal support member 16 with the axle pin 18.

Figure 4:
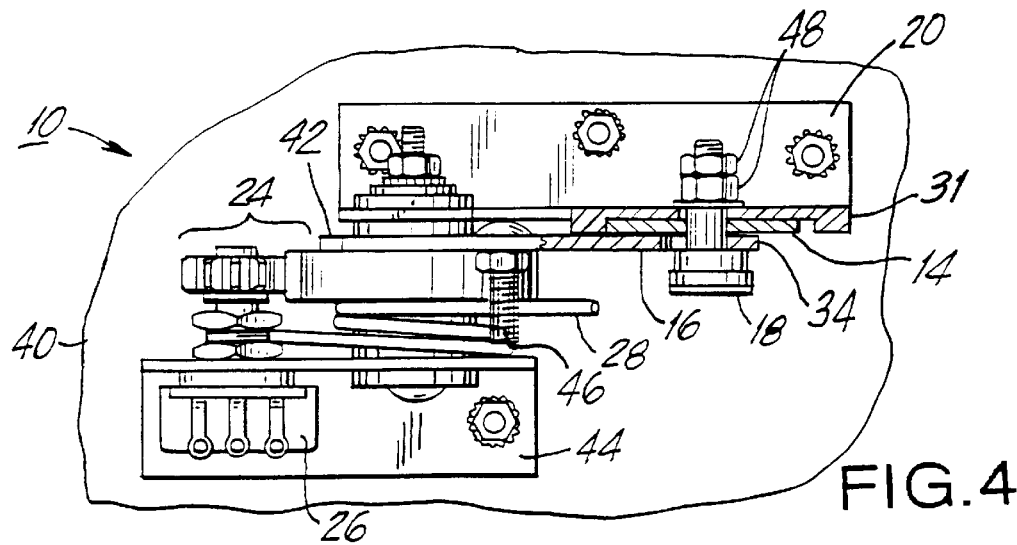
FIG. 4 illustrates a top view of the stable foot pedal assembly of FIG. 1 wherein the foot pedal has been removed in order to more clearly show the details of the remaining components.
Figure 2:
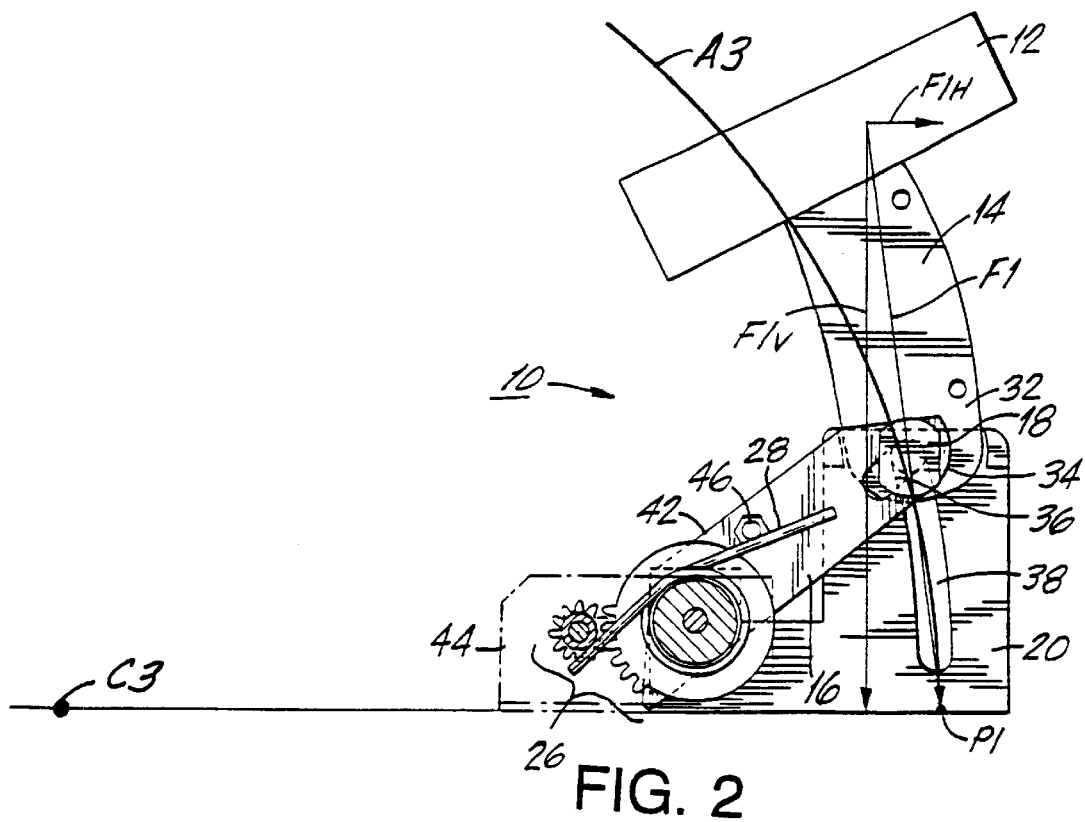
FIG. 2 illustrates a second perspective view of the stable foot pedal assembly of FIG. 1 wherein the foot pedal is not substantially depressed and some of the components have been removed in order to more clearly show a first slot and an arcuate retention slot.
Figure 3:
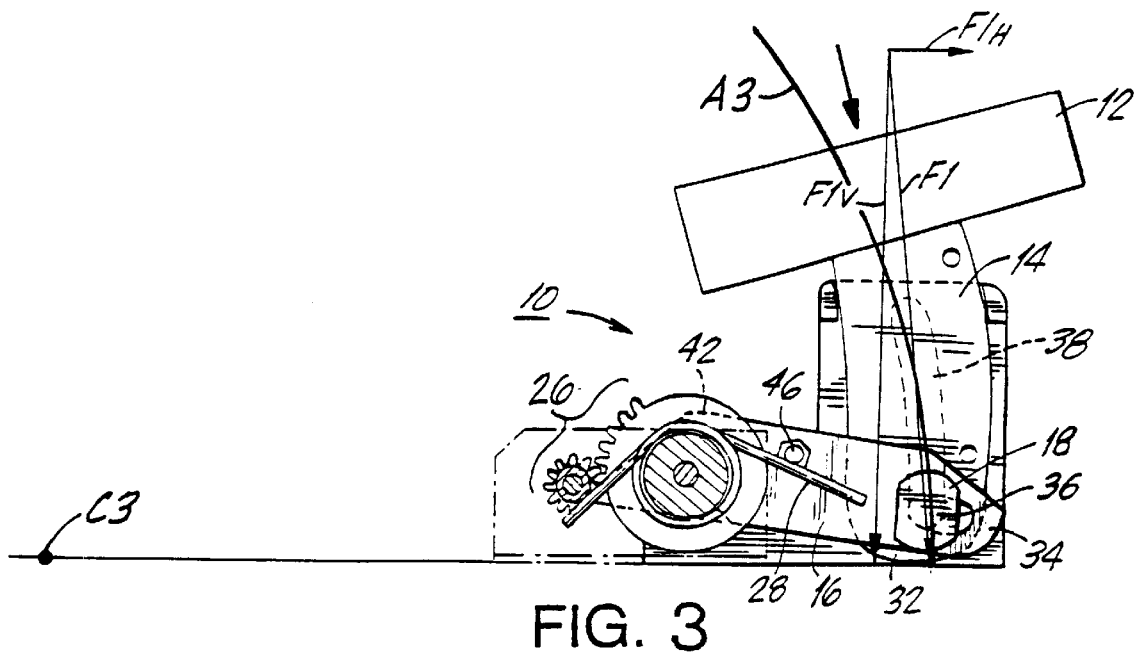
FIG. 3 illustrates the stable foot pedal assembly of FIG. 2 wherein a horizontal support member is substantially depressed.
Figure 8:
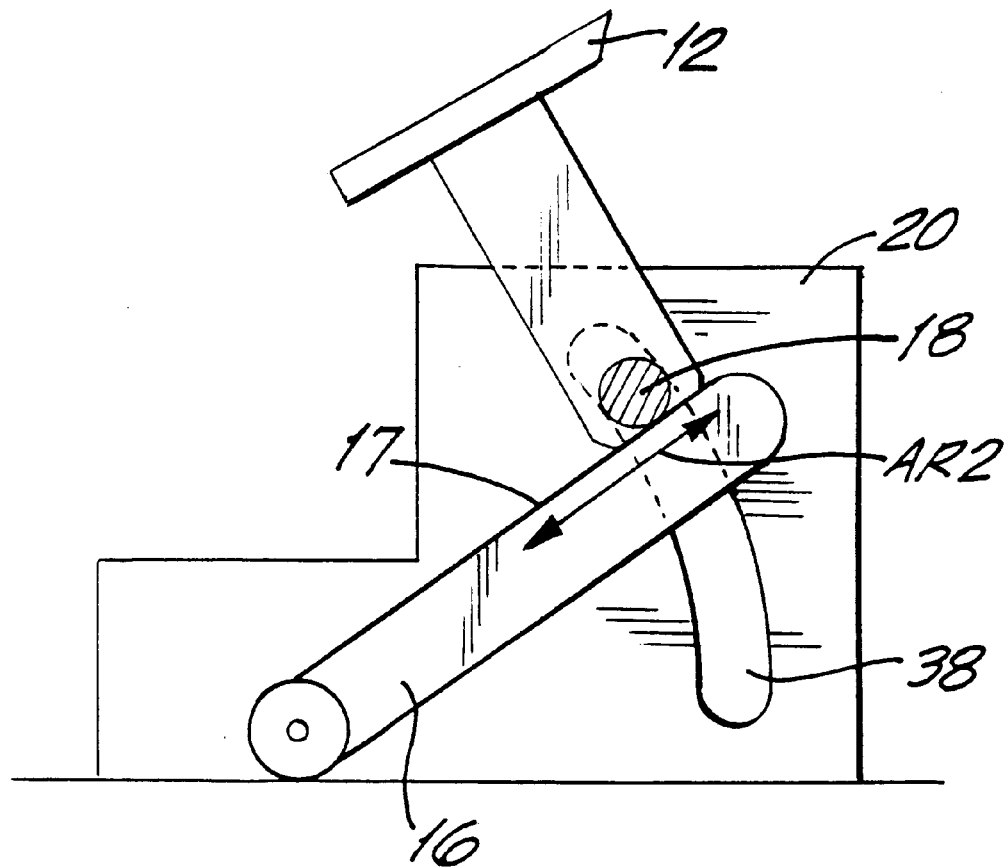
FIG. 8 illustrates an alternative embodiment of the foot pedal assembly of FIG. 1 wherein an axle pin slides along a top edge of the horizontal support member rather than within the first slot.

Referring to FIGS. 2 and 3, the axle pin 18 extends through an aperture located on the lower end 32 of the vertical support member 14, a first slot 36 located on the fore end 34 of the horizontal support member 16, and an arcuate retention slot 38 located on the vertical guide member 20. A longitudinal axis of the first slot 36 is substantially parallel to a longitudinal axis of the horizontal support member 16. The horizontal support member 16 tends towards being horizontally disposed upon depression of the foot pedal 12. The vertical guide member 20 is rigidly affixed to the base 22 as shown on FIG. 1. Referring back to FIG. 2, the axle pin 18 functions to couple the lower end 32 of the vertical support member 14 with the fore end 34 of the horizontal support member 16 while permitting these components to slide along an arc defined by the arcuate retention slot 38 upon depression of the foot pedal 12 by the user. The axle pin 18 is itself retained within the arcuate retention slot 38 by one or more nuts 48, as shown in FIG. 4, or equivalent means well known in the art, which permit a slidable yet secure means of fastening. In the preferred embodiment the first slot 36 in the horizontal support member 16 functions to retain the axle pin 18 in order to create increased stability of the foot pedal assembly during operation. However, the axle pin 18 could also slide along a top edge 17 of the horizontal support member 16 in the directions shown by bi-directional arrow AR2 without the necessity of being retained within the first slot 36 as shown in the alternative embodiment of FIG. 8.

Figure 5:
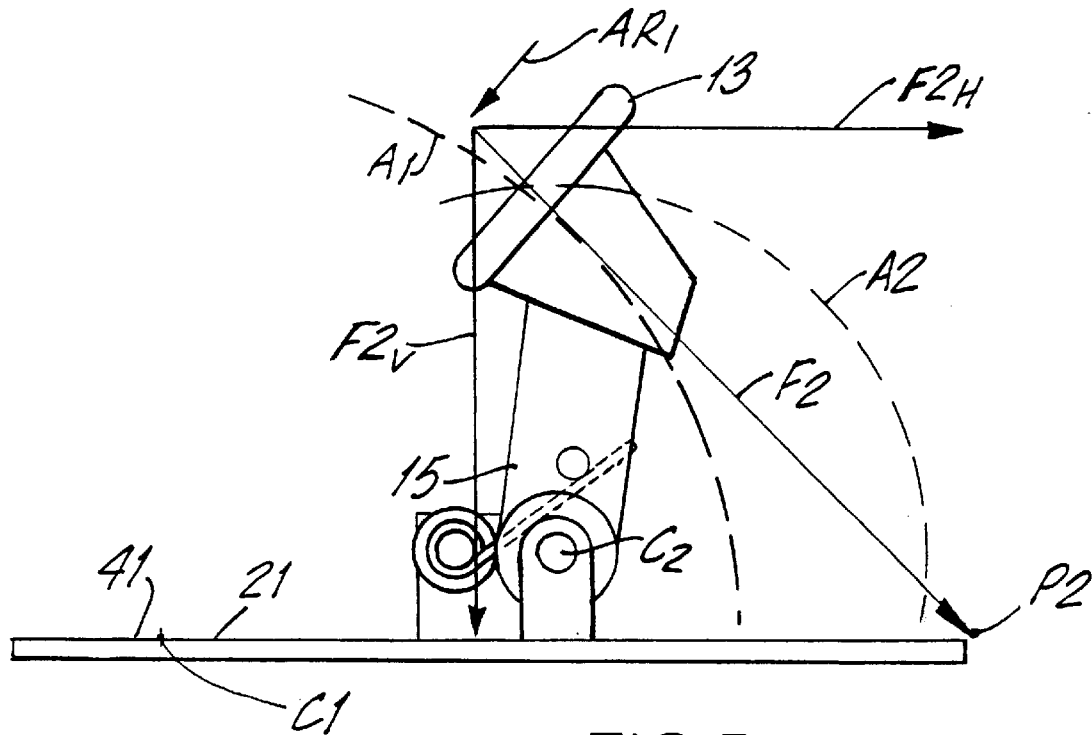
FIG. 5 illustrates a foot pedal assembly of the prior art wherein the foot pedal is not substantially depressed.
Figure 6:
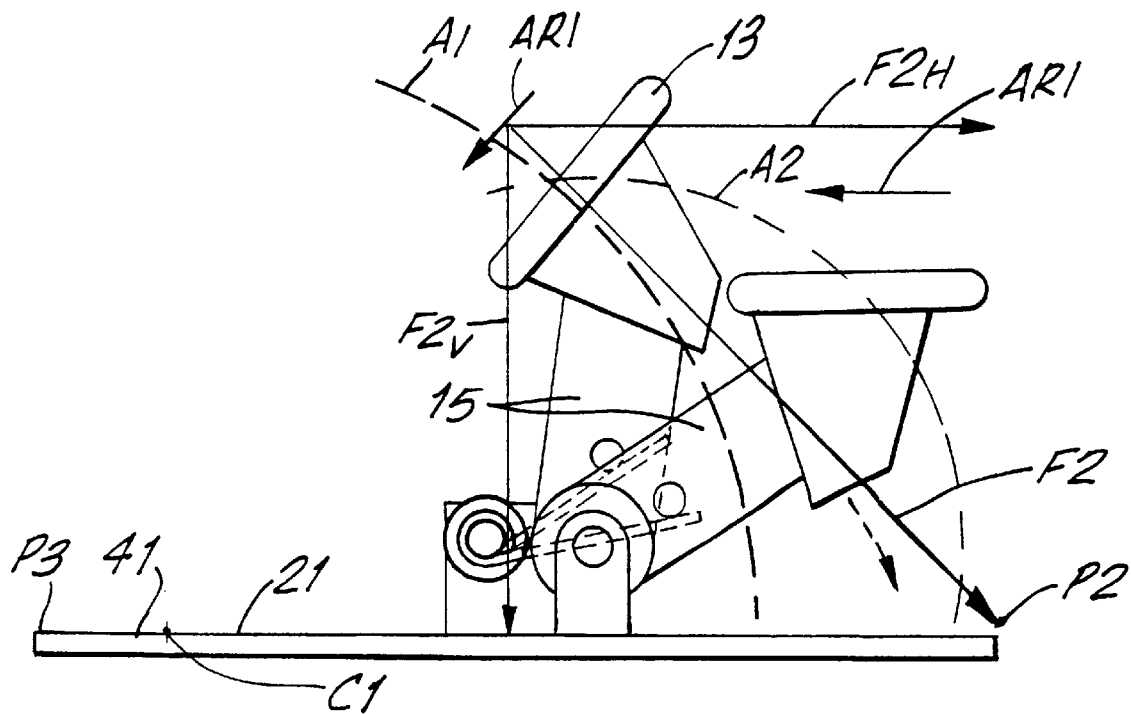
FIG. 6 illustrates the foot pedal assembly of FIG. 5 wherein the foot pedal is substantially depressed.
Figure 9:
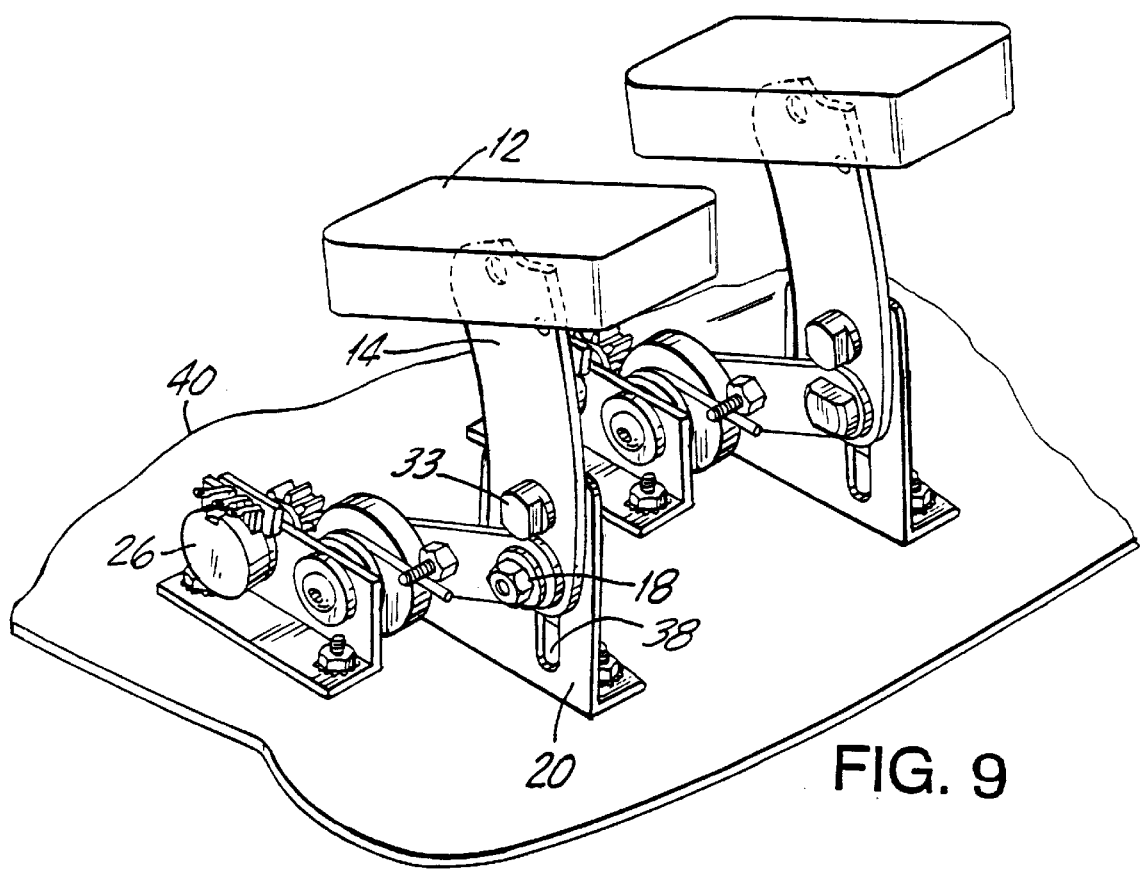
FIG. 9 illustrates an alternative embodiment of the foot pedal assembly of FIG. 1 wherein a guide pin is used to restrict forward motion of a vertical support member.

It is important to note that a major advantage of the present invention is that the arc defined by the arcuate retention slot 38 follows or profiles substantially the same arc as that made by the user's foot in depressing the foot pedal 12 in a natural fashion. This feature virtually eliminates the lifting or raising of the aft portion 40 of the base in response to depression of the foot pedal 12 which is a major disadvantage in the design of the prior art described above and illustrated in FIGS. 5 and 6. Another advantage of the present invention is that in order to depress the foot pedal 12, the user raises and lowers his foot while keeping his heel substantially fixed in one location just as with the foot pedal in a full-size vehicle or aircraft. Thus, the sensation of realism in the user is heightened through use of the present invention. As shown in FIG. 2, the user in depressing the foot pedal 12 exerts an average downward force F1 over the arc defined by the arcuate retention slot 38. The downward force F1 comprises a vertical component $F1_V$ and a horizontal component $F1_H$. Note that the horizontal component $F2_H$ exerted over the travel of the foot pedal 13 in the foot pedal assembly of the prior art as illustrated in FIGS. 5 and 6 is much greater than $F1_H$. Thus, the arcuate retention slot 38 in conjunction with a tab 31 (which prevents the forward translation of the vertical support member 14 during depression and release of the foot pedal 12) substantially decrease the horizontal component $F1_H$ as compared to $F2_H$ as the axle pin 18 is guided along its path. An alternative to using the tab 31 to restrict the forward motion of the vertical support member, would be to use a guide pin 33 extending through the vertical support member 14 and arcuate retention slot 38 and travelling with the axle pin 18 within the arcuate retention slot during depression and release of the foot pedal 12, as shown in FIG. 9. Since the downward force F1 terminates at point P1 the tipping of the aft portion 40 of the base 22 is virtually eliminated. This is to be contrasted with the prior art as illustrated in FIGS. 5 and 6, where the force F2 terminates at point P2 (that is substantially forward of point P1 in the present invention as illustrated in FIG. 2) resulting in a commensurate shift in the center of gravity of the base 21 and raising of the aft portion 41 of the base 21 upon depression of the foot pedal 13. As shown in FIG. 6 the aft portion 41 of the base 21 must be held down in order to prevent its tipping vertically upward. Despite illustration of specific mechanical details regarding alternative means for restricting the path of the foot pedal, it is to be understood that for purposes of substantially eliminating the horizontal component of the downward force on the foot pedal numerous alternative embodiments could be used, such as a column on the vertical support member 14, while remaining within the scope of the invention.

An additional advantage that the present invention provides over the prior art is the substantial elimination of slippage between the user's foot and the foot pedal 12 during depression and release of the foot pedal 12. As shown in FIGS. 2 and 3, the path of the foot pedal 12 defines an arc A3 with center C3. The arcuate retention slot 38 follows the same arc A3. Therefore, if the user's heel is maintained substantially at the center C3 during the depression and release of the foot pedal 12, then there will be substantially no slippage between the portion of the user's foot in contact with the foot pedal 12 and the foot pedal 12. The theoretical concepts discussed above are described in greater detail in F. Beer & E. Johnston, Jr., *Vector Mechanics for Engineers Statics and Dynamics* (1977), which is hereby incorporated by reference.

In addition, the first slot 36 functions to permit the axle pin 18 to slide towards an aft end 42 of the horizontal support member 16 as the vertical support member 14 urges the fore end 34 of the horizontal support member 16 generally downwards. The first slot 36 is necessary in this embodiment, otherwise the horizontal support member 16 would be stopped from any generally downward movement defined by the arcuate retention slot 38 as shown in FIG. 3. This is due to the fact that the arc defined by the travel of the horizontal support member 16 is eccentric to the arc defined by the arcuate retention slot 38.

The horizontal support member 16 is rotatably attached at the aft end 42 to a mounting bracket 44 affixed to the base 22 (as illustrated in FIG. 1). The biasing means 28, as shown in a compressed state in FIG. 3, functions to urge the horizontal support member 16 against the downward force F1 in order to return the foot pedal 12 to the substantially non-depressed state shown in FIG. 2 by exerting pressure against a retaining pin 46 located on the horizontal support member 16. The gear means 24 functions to translate the rotation of the horizontal support member 16 to a rotation of the potentiometer 26, which is illustrated as an arm of a potentiometer 26 in FIGS. 1, 2 and 3. As the arm is rotated an output signal from the potentiometer will be varied (e.g., in voltage or current) thereby reflecting the degree that the foot pedal 12 has been depressed. The variable output signal can then be interpreted by the personal computer as an indication of the user's command. The variable output signal could control such parameters as velocity, acceleration, and the application of brakes in a video game comprising a simulated auto race.

Figure 7:
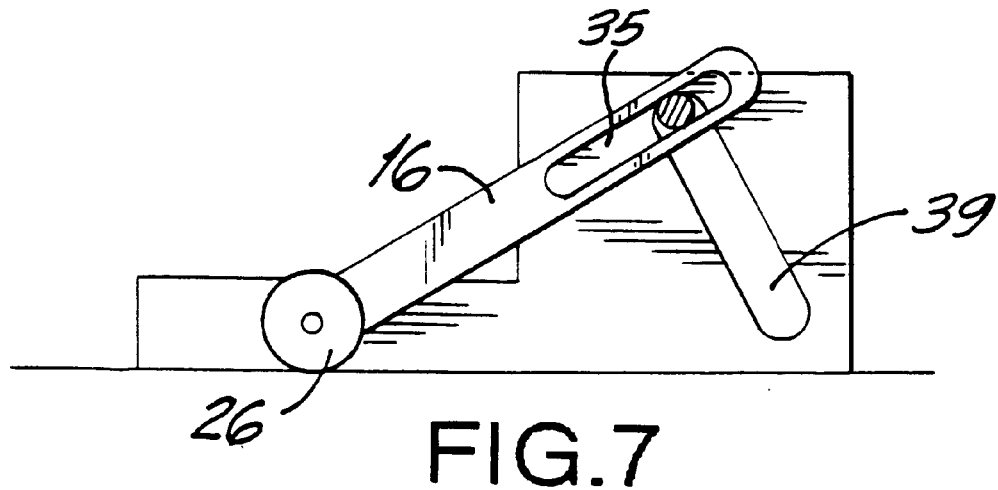
FIG. 7 illustrates another embodiment of the foot pedal assembly of the present invention comprising a substantially non-curved retention slot.

Another embodiment of the present invention is illustrated in FIG.7, wherein the arcuate retention slot 38 is reshaped to comprise a retention slot 39 with non-curved sides. In the embodiment shown in FIG. 8 the user's foot is still permitted to travel along its natural path while the slot 35 compensates for eccentricity between the natural travel of the user's foot and the non-arcuate shaped retention slot 39.

Although the invention has been shown and described with respect to best mode embodiments thereof, it should be understood by those skilled in the art that the foregoing and various other changes, omissions and additions in the form and detail thereof may be made therein without departing from the spirit and scope of the present invention.

We claim:

1. A foot pedal assembly comprising:

a base;

a first support member comprising an upper end and a lower end;

a foot pedal attached to said upper end of said first support member;

a second support member comprising a fore end and an aft end;

a guide member affixed to said base, said guide member comprising a retention slot; and means for coupling said fore end of said second support member and said lower end of said first support member within said retention slot of said guide member, said means for coupling slidingly guiding said fore end of said second support member and said lower end of said first support member substantially along said retention slot upon application of a downward force to said foot pedal.

2. The foot pedal assembly of claim 1, further comprising biasing means for opposing said downward force.

3. The foot pedal assembly of claim 2, wherein said biasing means opposes said downward force by exerting force against said base and a retaining pin located on said second support member.

4. The foot pedal assembly of claim 1, further comprising gear means, affixed to said aft end of said second support member and rotatably affixed to said base, for translating said sliding of said fore end of said second support member substantially along said retention slot upon application of said downward force into a rotational force.

5. The foot pedal assembly of claim 4, further comprising signal generation means for outputting a signal corresponding to the degree of rotation of said gear means.

6. The foot pedal assembly of claim 5, wherein said signal generation means comprises a potentiometer.

7. The foot pedal assembly of claim 1, wherein said foot pedal is rotatably attached to said first support member such that said foot pedal is permitted to rotate about a point of attachment.

8. The foot pedal assembly of claim 1, wherein said coupling means comprises an axle pin extending substantially through said lower end of said first support member and said retention slot, said axle pin sliding substantially along a top edge of said second support member.

9. The foot pedal assembly of claim 1, wherein said coupling means comprises an axle pin extending substantially through a first slot located at said fore end of said second support member, said lower end of said first support member and said retention slot.

10. The foot pedal assembly of claim 9, wherein said coupling means further comprises a tab on said guide member which limits forward displacement of said first support member.

11. The foot pedal assembly of claim 1, wherein said coupling means comprises an axle pin extending substantially through said fore end of said second support member, said lower end of said first support member and said retention slot, and a guide pin extending through said lower end of said first support member and said retention slot.

12. The foot pedal assembly of claim 1, wherein a longitudinal axis of said first support member is substantially vertically disposed.

13. The foot pedal assembly of claim 1, wherein a longitudinal axis of said second support member tends towards being substantially horizontally disposed upon depression of said foot pedal.

14. The foot pedal assembly of claim 1, wherein said retention slot is substantially arcuate.

15. A foot pedal assembly comprising:

a base;

a foot pedal;

a first support member comprising an upper end and a lower end, said upper end attached to said foot pedal;

a second support member comprising a fore end and an aft end;

a guide member comprising an arcuate retention slot and affixed to said base;

means for coupling said fore end of said second support member and said lower end of said first support member within said retention slot of said guide member, said means for coupling slidingly guiding said fore end of said second support member and said lower end of said first support member substantially along said arcuate retention slot upon application of a downward force to said foot pedal;

biasing means for opposing said downward force;

gear means affixed to said aft end of said second support member and rotatably affixed to said base, said gear means for translating said sliding of said fore end of said second support member substantially along said retention slot upon application of said downward force into a rotational force;

signal generation means for outputting a signal corresponding to the degree of rotation of said gear means.

16. The foot pedal assembly of claim 15, wherein said coupling means comprises an axle pin extending substantially through said lower end of said first support member and said retention slot, said axle pin sliding substantially along a top edge of said second support member.

17. The foot pedal assembly of claim 15, wherein said coupling means comprises an axle pin extending substantially through a first slot located at said fore end of said second support member, said lower end of said first support member and said retention slot.

18. The foot pedal assembly of claim 17, wherein said coupling means further comprises a tab on said guide member which limits forward displacement of said first support member.

19. The foot pedal assembly of claim 15, wherein said coupling means comprises an axle pin extending substantially through said fore end of said second support member, said lower end of said first support member and said retention slot, and a guide pin extending through said lower end of said first support member and said retention slot.

* * * * *

UNITED STATES PATENT AND TRADEMARK OFFICE
CERTIFICATE OF CORRECTION

PATENT NO. : 6,008,797
DATED : December 28, 1999
INVENTOR(S) : Sanderson et al.

It is certified that error appears in the above-identified patent and that said Letters Patent is hereby corrected as shown below:

On the title page: Item [56] delete-- 5,237,891  8/1993  Lundberg et al--.

Signed and Sealed this

Seventh Day of November, 2000

Attest:

Q. TODD DICKINSON

*Attesting Officer*    *Director of Patents and Trademarks*